United States Patent
Meyer et al.

(12)

(10) Patent No.: US 6,380,130 B1
(45) Date of Patent: Apr. 30, 2002

(54) PRODUCT CAPABLE OF TRANSFORMING A TOXIC, CORROSIVE OR ENVIRONMENTALLY HARMFUL LIQUID PRODUCT INTO A HARMLESS OR NON-AGGRESSIVE RESIDUE

(75) Inventors: Marie-Claude Meyer, 243 rue de Vaugirard, 75015 Paris; Laurence Mathieu, Courdimanche; Joël Blomet, Valmondois, all of (FR)

(73) Assignee: Marie-Claude Meyer (FR)

( * ) Notice: Subject to any disclaimer, the term of this patent is extended or adjusted under 35 U.S.C. 154(b) by 0 days.

(21) Appl. No.: 09/421,763

(22) Filed: Oct. 19, 1999

(30) Foreign Application Priority Data

Oct. 19, 1998 (FR) .......................................... 98 13070

(51) Int. Cl.⁷ ................................................ B01J 20/22
(52) U.S. Cl. ....................................... 502/401; 252/190
(58) Field of Search ........................ 252/190; 502/401; 422/32; 134/7; 588/218, 901

(56) References Cited

U.S. PATENT DOCUMENTS

| 4,948,818 A | 8/1990 | Carmody et al. | 521/149 |
| 5,126,309 A | 6/1992 | Chromecek et al. | 502/402 |
| 5,342,543 A | 8/1994 | Morris et al. | 252/190 |
| 5,409,769 A | * 4/1995 | Fukumoto et al. | 502/401 |

FOREIGN PATENT DOCUMENTS

EP     398 538     11/1990

OTHER PUBLICATIONS

Abstract in English of FR 2 602 677 no date.
Abstract in English of FR 2 604 900 no date.

* cited by examiner

Primary Examiner—Stuart L. Hendrickson
(74) Attorney, Agent, or Firm—Piper Marbury Rudnik & Wolfe

(57) ABSTRACT

The invention relates to a product capable of transforming a toxic, corrosive or environmentally harmful liquid product into a harmless or non-aggressive residue comprising:
    at least one amphoteric selected in such a way that:
        the pH of the residue obtained is within the range of from 5 to 10, preferably from 5.5 to 9.7,
        the lowest of the acidic pK values of the amphoteric is within the range of from 5 to 10, preferably from 5.5 to 9.7, and the highest of the basic pK values of the amphoteric is within the range of from 5 to 10 and preferably from 5 to 8, and
        the highest of the basic pK values of the amphoteric is lower than the lowest of the acidic pK values,
    at least one lipophilic absorbent and
    at least one hydrophilic absorbent.

8 Claims, No Drawings

PRODUCT CAPABLE OF TRANSFORMING A TOXIC, CORROSIVE OR ENVIRONMENTALLY HARMFUL LIQUID PRODUCT INTO A HARMLESS OR NON-AGGRESSIVE RESIDUE

FIELD OF THE INVENTION

The object of the invention is a product capable of transforming a toxic, corrosive or environmentally harmful liquid product into a harmless or non-aggressive residue.

BACKGROUND OF THE INVENTION

Situations can occur in which toxic, corrosive or environmentally harmful liquid products such as strong acids, strong bases, powerful oxidants and reducers, solvents, oils, and fats, spill onto the benches or floor when being handled in the laboratory or in factories or during transportation. It is therefore very important to be is able to clean them up and dispose of them quickly.

Different types of clean up methods and products are used depending on the type of liquid spilled.

For example, acid or alkaline products are usually cleaned up by rinsing with plenty of water. However, large quantities of water are required, and sometimes a clearance of the laboratory or factory. Alternatively, such liquid products can be pumped away. However, the choice of pump will depend on the nature of the product which has been spilled. Another solution is to pour sand or clay or an absorbent or super-absorbent product over the toxic or corrosive product and then sweep everything away. However, the residues obtained remain aggressive and suitable equipment is therefore needed whilst the person dealing with the problem must exercise caution to avoid any contact with any part of the body since there is still a high risk of burning or irritation.

Furthermore, absorbent or super-absorbent products can not be used to clean up strong acids or bases. These latter destroy their absorbent properties and therefore render them useless.

Accordingly, the choice of cleaning method will depend on the type of liquid that has been spilled. To date, no product has been found which can be used as an effective universal treatment for all corrosive, hazardous and/or environmentally harmful liquid products.

OBJECTS AND DETAILED DESCRIPTION OF THE INVENTION

It is to the credit of the inventor that a product has now been defined and developed which is capable of transforming a toxic, corrosive or environmentally harmful liquid product into a non-aggressive and harmless residue, which is characterized by the fact that it comprises:
at least one amphoteric selected in such a way that:
the pH of said residue obtained is within the range of from 5 to 10, preferably 5.5 to 9.7,
the lowest acidic pK of the amphoteric is within the range of from 5 to 10, preferably from 5.5 to 9.7, and the highest basic pK of the amphoteric is within the range of from 5 to 10 and preferably from 5 to 8,
the highest basic pK of the amphoteric is lower than the lowest of the acidic pK values,
at least one lipophilic absorbent and
at least one hydrophilic absorbent.

The term "liquid product" is used here to denote any product having a liquid, semi-liquid, semi-pasty or pasty consistency.

It should be pointed out that an amphoteric is a substance or an ion which can fulfil the function of an acid in one situation and can fulfil the role of a base in another situation. It therefore has at least two dissociation constants (pK), one corresponding to the acidic function and the other to the basic function.

It should be pointed out that the pK is the opposite of the logarithm to the base 10 of the constant of the reaction:

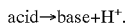

acid→base+H⁺.

Furthermore, the term "acidic pK" is used to denote the pK when the amphoteric is acidic, and "basic pK" is used to denote the pK when the amphoteric is basic.

In a preferred embodiment, the object of the invention is a product comprising at least two amphoterics selected in such a way and in such proportions that:
the pH of the residue is within the range of from 5 to 10 and preferably from 5.5 to 9.7,
the lowest of the acidic pK values is within the range of from 5 to 10 and preferably from 5.5 to 9.7 and the highest of the basic pK values is within the range of from 5 to 10 and preferably from 5 to 8,
the highest basic pK is lower than the lowest of the acidic pK values and
the ratio of the sum of the number of moles of amphoterics having an acidic pK within the range of from 5 to 10, and preferably from 5.5 to 9.7, to the sum of the number of moles of amphoterics having a basic pK within the range of from 5 to 10, and preferably from 5 to 8, is between 0.1 and 10. The product according to the invention comprises:
from 20 to 60% by weight, preferably from 15 to 55% by weight and more preferably still from 10 to 45% by weight, of at least one amphoteric as defined above,
from 2 to 20% by weight, preferably from 2 to 15% and more preferably still from 1 to 10%, of at least one lipophilic absorbent and
from 2 to 20% by weight, preferably from 2 to 15% and even more preferably from 1 to 10%, of at least one hydrophilic absorbent.

In most cases, at least two different amphoterics are used, one of which has an acidic pK and the other having a basic pK conforming to the requirements outlined above and which, for the sake of convenience, will be referred to hereafter as "anti-basic amphoteric" and "anti-acidic amphoteric", respectively.

The anti-basic amphoteric and the anti-acidic amphoteric are preferably not conjugate, i.e. one does not produce the other by an acid-base reaction.

The anti-basic amphoterics and anti-acidic amphoterics which may be used are in particular those described in patents FR86 11754 and FR86 14042 filed by the Assignee. In particular, the amphoterics used may be selected from the group comprising: the aminated acids such as glycine, alanine, serine, glutamine, lysine, alanyl alanine, histidine, L-histidyl-histidine, arginylarginine and mixtures thereof, sodium bicarbonate, trisodium edetate, disodium citrate.

The product according to the invention may contain a single amphoteric provided it has an acidic pK on the one hand and a basic pK on the other which comply with the conditions outline above.

Amongst the amphoterics of this type, mention may be made of L-histidyl-histidine and arginylarginine.

For the purposes of this invention, by lipophilic absorbents is meant absorbents or super-absorbents which are polymer products in particular, such as polyisonorbornene made by ATOCHEM and sold under the NORSOREX® brand and the products sold under the following names: OIL ABSORBER by SNF FLOERGER, GAMSORB by GAMLEN INDUSTRIES SA, granulated RHON'SEC by TOLSA FRANCE SA.

By hydrophilic absorbents is meant the hydrophilic absorbents and super-absorbents, in particular the acrylic super-absorbents such as NORSOCRYLO® S35 sold by ATOCHEM and the products sold under the names of AQUALIC® LAW45 by BASF, ASAP® 2000 and ASAP® 2003 by CHEMDAL LTD, FAVOR Z1030 by STOCKHAUSEN, DRYTECH 4535R by DOW CHEMICALS, AQUASORB 3005K1 by SNF FLOERGER, granulated RHON' SEC by TOLSA FRANCE SA.

The product according to the invention may contain additives, in particular coloring agents, anti-static agents, granulating agents, fillers and mixtures thereof.

The product according to the invention is in the form of a powder, granules or tablets. In one particular embodiment of the invention, the absorbent and neutralizing product is packaged in packs of shapes and dimensions suitable for obtaining for example sheets or sausages, making the product easier to use. Said packs are made in particular from a plastic or non-woven netting.

It may sometimes be necessary to add before use a certain quantity of water to the product according to the invention. This will be the case in particular if the spilled liquid is a strong acid. Since the latter contains only very little water, it may prove necessary to add some to ensure that the neutralization reaction is complete.

When the product according to the invention is applied on the liquid to be treated, the product swells and solidifies. A solid residue is thus obtained, which may be more or less compact depending on the nature of the toxic, corrosive or harmful liquid spilled. It is easy to dispose of this solid residue using a scraper, a brush or a shovel for example, without any risk of burning or irritation to the handler.

EXAMPLES

In the following examples, the product according to the invention is a mixture based on the following formula, given for 1 kg:

440.1 g of sodium bicarbonate, 393.4 g of glycine, 83.3 g of NORSOCRYL S35, 83.3 g of NORSOREX APX1.

Example 1

Use of the product according to the invention on potassium hydroxide:

100 ml of potassium hydroxide (KOH) having the concentration indicated in Table 1 below are tipped over a bench. The powder according to the invention is then spread initially around the puddle of KOH and then over its entire surface, in the quantities indicated in Table 1.

The powder swells and solidifies. The pH measurement taken with a pH paper shows that the residue obtained has a pH within the neutral pH range of 5.5 to 9.7.

TABLE 1

| Concentration of KOH in mol/l | Quantity of powder according to the invention in grams |
| --- | --- |
| 18 | 1000 |
| 12 | 670 |
| 6 | 340 |
| 1 | 60 |

Example 2

Use of the product according to the invention on ammonia

Example 1 is repeated replacing the 100 ml of potassium hydroxide with 100 ml of ammonia $NH_4OH$, the concentration of which are set out in Table 2.

The quantities of the powder according to the invention are also set out in Table 2.

TABLE 2

| Concentration of $NH_4OH$ in mol/l | Quantity of the powder according to the invention in grams |
| --- | --- |
| 21 | 590 |
| 14 | 390 |
| 6 | 170 |
| 1 | 30 |

Example 3

Use of the product according to the invention on sulphuric acid $H_2SO_4$ 100 ml of $H_2SO_4$, the concentration of which is set out in Table 3 below, are tipped over a bench. The powder according to the invention is then spread around the puddle of $H_2SO_4$ and then over its entire surface, in the quantities indicated in Table 3. Bubbles appear and a solid residue forms. A few drop of water are then added, the residue swells and more bubbles appear indicating that neutralization is complete.

A measurement taken with a pH paper shows that the solid residue formed is indeed within the neutral pH range of from 5.5 to 7.

TABLE 3

| Concentration of $H_2SO_4$ in mol/l | Quantity of the powder according to the invention in grams |
| --- | --- |
| 18 | 1000 |
| 12 | 670 |
| 6 | 340 |
| 1 | 60 |

Example 4

Use of the product according to the invention on nitric acid $HNO_3$

Example 3 is repeated replacing the 100 ml of $H_2SO_4$ with 100 ml of $HNO_3$.

The quantities of powder to be applied for each concentration of HNC3 are indicated in Table 4 below:

TABLE 4

| Concentration of $HNO_3$ in mol/l | Quantity of the powder according to the invention in grams |
|---|---|
| 21 | 590 |
| 14 | 390 |
| 6 | 170 |
| 1 | 30 |

The same quantities of powder may be applied if another strong acid (such as hydrochloric acid, trichloroacetic acid) is spilled.

Example 5

Use of the product according to the invention on acetic acid $CH_3COOH$

Example 3 is repeated, replacing the 100 ml of $H_2SO_4$ with 100 ml of $CH_3COOH$.

The quantities of powder to be applied for each concentration of $CH_3COOH$ are set out in Table 5 below.

TABLE 5

| Concentration of $CH_3COOH$ in mol/l | Quantity of the powder according to the invention in grams |
|---|---|
| 18 | 220 |
| 6 | 80 |
| 1 | 12 |

What is claimed is:

1. A product capable of transforming a toxic, corrosive or environmentally harmful liquid product into a non-aggressive or harmless solid residue, comprising:

at least one amphoteric selected from the group consisting of L-histidylhistidine and arginylarginine, having at least two pK values, $pK_1$ being a pK of the amphoteric when it is basic, $pK_2$ being a pK of the amphoteric when it is acidic, said amphoteric being selected in such a way that:

the pH of the residue obtained is within the range of from 5 to 10, the lowest of the $pK_2$ values of the amphoteric is within the range of from 5 to 10, and the highest $pK_1$ values of the amphoteric is within the range of from 5 to 10, and the highest of the $pK_1$ values of the amphoteric is lower than the lowest at the $pK_2$ value, at least one oil-soluble absorbent and
at least one water-soluble absorbent.

2. The product according to claim 1, wherein the pH of the residue obtained is within the range of from 5.5 to 9.7.

3. The product according to claim 1, wherein the lowest of the $pK_1$ values of the amphoteric is within the range of from 5.5 to 9.7.

4. The product according to claim 1, wherein the highest of the $pK_2$ value of the amphoteric is within the range of from 5 to 8.

5. The product according to claim 1 comprising:

from 20 to 60% by weight of at least one amphoteric, from 2 to 20% by weight of at least one oil-soluble absorbent and, from 2 to 20% by weight of at least one water-soluble absorbent.

6. The product according to claim 1, wherein the hydrophilic water-soluble absorbent is an acrylic polymer.

7. The product according to claim 1, containing colouring agents, fillers, granulating agents, anti-static agents and mixtures thereof.

8. The product according to claim 1, being in the form of a powder, granules or tablets in particular products packaged in packs, made in particular from a plastic or non-woven netting, in shapes and dimensions suitable for obtaining sheets or sausages.

* * * * *